United States Patent
Stephenson

[11] Patent Number: 6,156,397
[45] Date of Patent: Dec. 5, 2000

[54] POLARIZING PANEL AND METHOD FOR MAKING SAME

[75] Inventor: John Richard Stephenson, Surrey, United Kingdom

[73] Assignee: Clearvision, Inc., United Kingdom

[21] Appl. No.: 09/202,381

[22] PCT Filed: Jun. 14, 1996

[86] PCT No.: PCT/GB96/01436

§ 371 Date: Dec. 11, 1998

§ 102(e) Date: Dec. 11, 1998

[87] PCT Pub. No.: WO97/47995

PCT Pub. Date: Dec. 18, 1997

[51] Int. Cl.[7] .............................. E06B 3/24; G02B 27/28
[52] U.S. Cl. .................. 428/34; 428/304.4; 428/913.3; 359/485; 359/493; 52/786.1; 52/786.13
[58] Field of Search ............................ 428/172, 34, 116, 428/178, 913.3, 309.4; 359/542, 485, 493; 156/107, 109; 264/1.1, 1.31, 1.34; 52/783.1

[56] References Cited

U.S. PATENT DOCUMENTS 3,124,639   3/1964   Kahn .......................................... 88/65

*Primary Examiner*—Donald Loney
*Attorney, Agent, or Firm*—Nixon Peabody LLP

[57] ABSTRACT

A light polarizing panel comprises a plurality of layers of translucent material. At least one gap (14, 16) is provided between a pair of adjacent layers and at least one of the layers is a polarising layer (13) formed of cellular material with layered elliptical cells. The polarising layer (13) is formed firstly by a hot roll calendering process such that the cells become substantially elliptical. The material is then placed under tension and heated and passed to a pair of heated laminating rolls. The effect is to produce material which is glassified on its outer surfaces.

6 Claims, 2 Drawing Sheets

20 Reflective Surface

20 Reflective Surface        19 Elliptical Cells

POLARIZING PANEL AND METHOD FOR MAKING SAME

The present invention concerns a light polarising panel and a method of making a polarisation layer for inclusion therein.

The phenomena of light polarisation is well known. Christian Huygens successfully experimented with calcite crystals in the early 18th century and found that they absorbed most of the horizontally polarised light particles.

Whilst it is the basis of linear polarisation for sunglasses and camera lenses calcite crystals are of little practical value in lighting fixtures as 50% of the light is lost by this absorption as horizontally polarised particles are approximately 50% of radiated light An object of the present invention is to prevent the highest possible proportion of horizontally polarised particles leaving a lighting fixture by placing into the fixture aperture a multi-layer lens panel which, by a combination of reflection and refraction will induce reflux polarisation and preferactically vertically polarise the light.

In the middle of the 18th century Dominique Arago envisaged passing light through a stacked array of glass sheets. The refractive indices of the sheets allowed the partially vertically polarised light passing through the first sheet to be directed at a different critical angle to the second to secure more reflection of horizontally polarised particles. Provided that the light reflected from each surface was collected within the structure; depolarised by a reflective back surface and retrieved for a re-pass, the light emitted through the final glass plate was highly vertically plane polarised.

U.S. Pat. No. 2,402,176 discloses a polariser composed of 15–30 thin plastic sheets in permanent interfacial contact with each other with several advantages over the Arago method notably the lower absorption of light compared to thick glass plates.

U.S. Pat. No. 2,983,178 discloses a panel of 2–20 layers of glass flakes together with a low melting point glass. the panel then being heated, the low melting point of the glass in this compound was envisaged as creating air spaces with a marked difference in the refractive index of the glass flakes and the retained air.

U.S. Pat. No. 3,124,639 discloses the substitution of this glass compound by an extruded, translucent foam of polystyrene as he had observed that in such a thin is extruded sheet the action of the extruder flattened the cylindrical air cells in the plastic foam compound at the top and bottom surfaces of the sheet. It is to be noted that when the flattened cells were roughly in alignment they acted as an excellent polariser and the walls caused little light loss. Protective layers would be needed to maintain the flat plane of the base carrier sheet and a top layer of facing plastic shed to protect the fragile foam from damage and contaminants.

A method is known for continuously producing panels based on the above principle. A modified carrier sheet is also known which does not add to polarisation but is alleged to distribute the light more effectively.

The last mentioned panel has some disadvantages:

1. The degree of polarisation achieved with the foam material although significant and commercially successful is however limited to the efficiency of the creation of the flattened layered elliptical foam cells as described in U.S. Pat. No. 3,124,639 in the normal process of foam manufacture.

2. Any further changes that occur (if any) are limited to the bonding process described in U.S. Pat. No. 3,772,128. There are the additional material changes and the sole purpose of the invention is to bond three materials together by heat and thus save the cost of adhesives. By bonding the three into a composite component panels do not have the advantages of an interstitial component within which the additional air gaps between one or more succeeding layers improve the refractive performance.

3. The process specification to heat bond the facing film from the residual heat of the extruded base is layer, limits the protective efficiency of that film as it has to have a low melt point and be very thin. In consequence the panels are very susceptible to damage during transit; fitting into units and subsequent maintenance. When even slight damage occurs, the panels cannot be repaired and light from the lamps exposes damage marks.

4. The integral panel method makes it impossible for the panel to be so constructed as to conform to the Buildings Regulations in the U.K. and many other countries as the foam used to surface melt on to the prismatic sheet, would by definition melt at the temperatures envisaged in the ignition tests of the Building Regulations.

According to the present invention a light polarising panel comprises a plurality of layers of translucent material, at least one gap for fluid being provided between a pair of adjacent layers and at least one of the polarising layers being of a cellular material with layered elliptical cells.

Also according to the present mention a method of making a polarising layer of cellular material having elliptical cells comprises a hot roll calendering process in which a combination of higher roll temperatures and increased material tensions produces a continuous roll of sheet with a pronounced elliptical shape to the cell structures and reduced thickness from the normal 1 mm to 0.8 mm the sheet subsequently being fed to a dispenser roll which is placed at an appropriate distance from laminating rolls and, whilst the material is travelling from the dispenser roll to the laminating rolls, it is preheated and placed under controlled tension just under break point of the material, the laminating rolls being heated to between 90 and 110 degrees, the roll compression producing a glassification effect on the material.

This invention is a highly flexible and very efficient method of vertically plane polarising light by the well known reflux polarisation principle of refracting the reflecting electromagnetic light waves according to their angles of incidence when striking a multi-lens interstitial panel with a major difference in the refractive indices of the air or gas between the transparent lenses and the lens material producing typically a ratio of 1:1.6.

The material layers within the component panel may have the same or advantageously, different refractive indices.

The invention will now be described further by way of example with reference to the accompanying drawings, in which.

Figure 1:
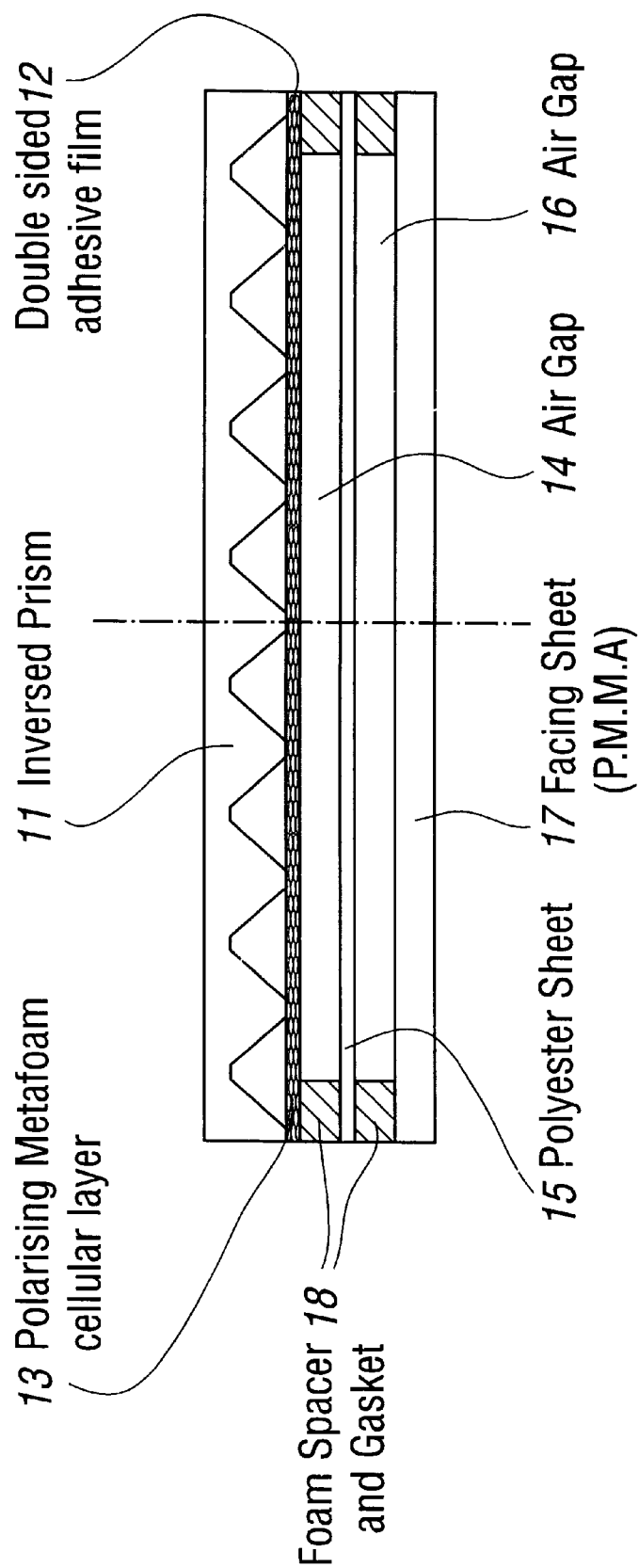
FIG. 1 is a cross section of a preferred form of panel in accordance with the invention.

The composite panel shown in FIG. 1 comprises a prismatic PMMA sheet 11, a two sided adhesive polyester sheet 12, a polarising layer 13 hereinafter called "metafoam" having elliptical cells, an air gap 14, a polyester sheet 15, an air gap 16, a plain PMMA cover sheet 17. The layers may be enclosed in a foam gasket 18.

Figure 2:
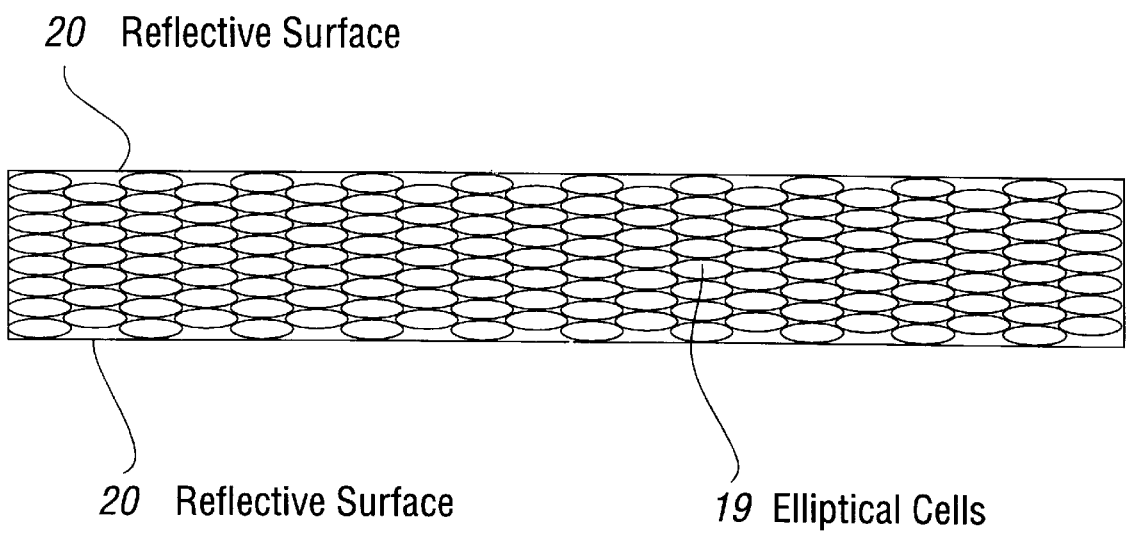
FIG. 2 is an enlarged cross-section of the polarising layer of cellular material.

FIG. 2 shows a view, in cross-section, of the metafoam layer 13 having a cellular core of overlapping elliptical cells 19 and outer melted reflected surfaces 20.

Figure 3:
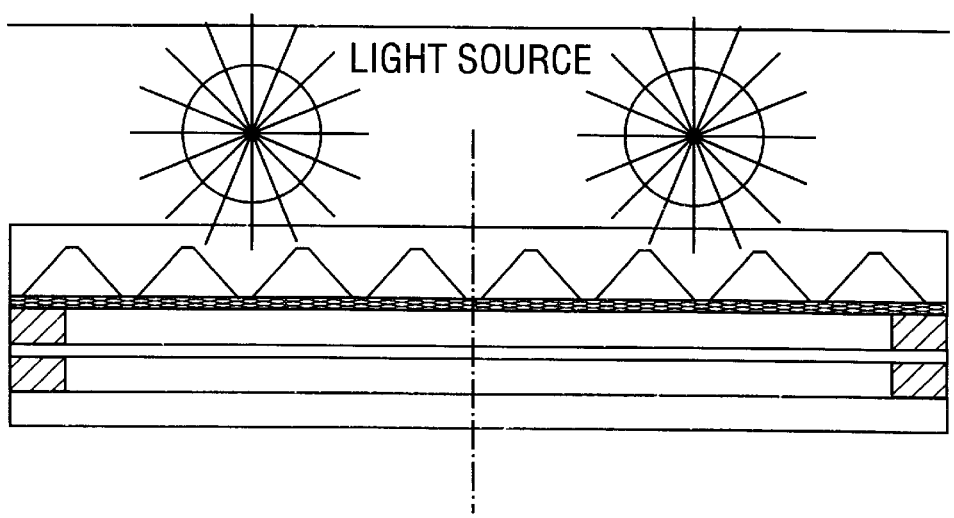
FIG. 3 is a cross-sectional view of the panel showing its position relative to a light source.

FIG. 3 shows a detail of the panel relative to a light source 21 which can be of any type including sunlight or any type of electrical or gaseous type. In this drawing the prismatic sheet 11 is shown with its irregular surface facing away from the light source but it is equally possible for it to be reversed.

Alternatively this base panel 11 may be plain or patterned with translucent finishes but a prismatic design with well defined prisms with flat planed sides will refract the light better and optimise the polarising effect.

The base sheet material preferentially is of prismatic polymethylmethalcrylate (PMMA) although other materials such as acrylic, polycarbonate or PVC may be used provided that they are fully polymerised so that internal light scatter is minimised and light transmission values are the highest possible.

The light waves will then transverse a layer of metafoam 13, a highly efficient polarising cellular material which also has high light transmission properties. This is laminated to the base sheet 11 using s highly translucent adhesives or pressure mounting films.

Metafoam can be produced with varied properties in a flexible two stage process. It is a two stage modification of a very low density closed cell polyethylene (a relatively thick cellular material) which will respond favourably to manipulated changes in cell structure shape from round to elliptical.

The first stage is a hot roll calendering process in which a combination of higher roll temperatures and increased material tensions produces a continuous roll of sheet with pronounced elliptical shape to the cell structures and reduced in process thickness from the normal 1 mm to 0.8 mm. As the material is thermoplastic, this cell structure shape is retained after processing.

The second stage further improves the optical efficiency of the elliptical cell shapes and glassifies both panel surfaces to increase internal reflections within the cellular structure. This further reduces the material thickness from 0.8 mm to 0.6 mm.

A roll gantry is placed at an appropriate distance from the laminating rolls. While the material is travelling from the dispenser roll to the laminating rolls it is preheated and placed under carefully controlled tension just under the break point of the material. The laminating rolls are heated to between 90 and 110 degrees with the best results obtained at the higher temperature. Roll compression produces a glassification effect and the material has now the markedly different appearance and textural feel of a sealed surface.

Refracted light emerging from the metafoam layer is further refracted by passing through one or more air gaps and one or more layers of clear material with very high light transmission qualities or is reflected and directed by specular finish louvre blades set within the sealed panel frame. It is essential that diffusion of the reflectance from such louvres is as low as possible and preferably less than 5%.

The final surface of the panel will preferably be of plain PMMA with very high light transmission properties and minimum light scatter in the thickness range of 1 mm to 2 mm. Alternatively, the facing layer material may be of PVC or polycarbonate to meet certain fire regulations. All facing materials will have high resistance to damage from scratching or impact.

The several layers of the panels are separated by adhesive spacers on the periphery of each layer. Depth of the air or gaseous gaps may be determined by several factors but must not be less than 5 microns.

The adhesive spacers seal the panel interiors from the ingress of dirt, bacteria or other contaminants and normally need to have self sealing qualities as fixing devices to the frame may need to penetrate the panel periphery.

The panels are framed with any suitable material such as steel, aluminium, P.V.C. (or similar thermoplastic) extruded sections (FIG. 7). The frame is normally mitred and sealed directly to the panel by an acrylic adhesive dispensed through a needle syringe.

This frame may of a strength and dimension to accept spring clips of other fixing devices. The frame may also have a peripheral rail on two or four sides to assist fitting into ceiling grids. This extension rail may be perforated to act as an air handling element in the design of air conditioning air flow pathways.

The panels will transmit polarise light across the full visible spectrum from 290 to 780 nm. This is particularly important in the range 390–430 nm as it is well known that the short wave-lengths of ultra violet light polarises more easily than long wave-lengths. In consequence the panel in this invention will produce significantly more polarisation than previously experienced as most of the ultra violet light is blocked by thermoplastic panels in current use.

These sealed panels and damage resistant panel surfaces also have the obvious advantage of low maintenance costs as they can be wipe cleaned or dusted using any cleaning material in common use.

What is claimed is:

1. A light polarizing panel comprising a plurality of layers of translucent material, and a spacer between at least one pair of the layers defining a gap therebetween, at least one of the layers being formed of a polarizing cellular material with layered elliptical cells.

2. A panel as claimed in claim 1, in which the spacer comprises an adhesive foam gasket.

3. A panel as claimed in claim 1, in which the top and bottom panel surface sheets are of high impact material resistant to scratches, water, ultra violet radiation and cleaning and have self extinguishing flame characteristics.

4. A panel as claimed in claim 1, in which the cellular material layer comprises a high tension calendered close polyethylene, the elliptical cells being layered above each other and elongated, and surfaces of said layer being sealed by a heated laminating process which melts the cells at each of the surfaces.

5. A panel as claimed in claim 1, in which a directional louvre is enclosed within the panel.

6. A panel as claimed in claim 1, in which the panel transmits light in the wavelength range 290 to 780 nm.

* * * * *